United States Patent [19]

Jochum

[11] Patent Number: 5,009,681
[45] Date of Patent: Apr. 23, 1991

[54] AIR INLET CHAMBER FOR A MIXTURE FORMER OF A MOTOR VEHICLE

[75] Inventor: Gunter Jochum, Eschborn, Fed. Rep. of Germany

[73] Assignee: General Motors Corporation, Detroit, Mich.

[21] Appl. No.: 450,870

[22] Filed: Dec. 18, 1989

[30] Foreign Application Priority Data

Dec. 21, 1988 [DE] Fed. Rep. of Germany ....... 3843019

[51] Int. Cl.$^5$ ............................................. F02M 35/10
[52] U.S. Cl. ......................................... 55/416; 261/19; 55/DIG. 28
[58] Field of Search ........................ 261/19, DIG. 82; 55/416, 510, DIG. 28

[56] References Cited

U.S. PATENT DOCUMENTS

| | | | |
|---|---|---|---|
| 1,746,218 | 2/1930 | Kamrath | 55/416 |
| 1,934,311 | 11/1933 | Kegerreis et al. | 55/416 |
| 2,462,797 | 2/1949 | Whittaker | 55/416 |
| 2,983,267 | 5/1961 | Percival | 55/DIG. 28 |
| 3,615,296 | 10/1971 | Garnaschelli | 48/180 R |
| 3,814,391 | 6/1974 | Cedarholm | 261/50 R |
| 3,919,995 | 11/1975 | Todd | 55/DIG. 28 |
| 4,244,814 | 1/1981 | Matsumura et al. | 55/416 |
| 4,313,411 | 2/1982 | Moriyama et al. | 261/DIG. 82 |

FOREIGN PATENT DOCUMENTS

| | | |
|---|---|---|
| 451559 | 10/1927 | Fed. Rep. of Germany . |
| 885026 | 7/1953 | Fed. Rep. of Germany . |
| 2219982 | 11/1973 | Fed. Rep. of Germany . |
| 1962113 | 9/1974 | Fed. Rep. of Germany . |
| 2832207 | 12/1979 | Fed. Rep. of Germany . |
| 615247 | 7/1978 | U.S.S.R. ................................. 55/416 |

OTHER PUBLICATIONS

German search report, Aug. 10, 1989, 6 pages.

*Primary Examiner*—Tim Miles
*Attorney, Agent, or Firm*—Gordon F. Belcher

[57] ABSTRACT

Located on an air outlet (3) of an air inlet chamber leading to a mixture former is a star-shaped insert (6), which provides for evening-out of the air flowing out of the air outlet (3) by means of linearly oriented air conducting surfaces (8) arranged in a ray pattern. This results in more uniform mixture formation even at varying engine speeds.

8 Claims, 1 Drawing Sheet

AIR INLET CHAMBER FOR A MIXTURE FORMER OF A MOTOR VEHICLE

TECHNICAL FIELD

The invention pertains to an air inlet chamber for a mixture former of a motor vehicle, which has a lateral air inlet to connect with a hose coming from an air filter of the motor vehicle and an axial air outlet to introduce the air into the mixture former. In mixture formers of current motor vehicles, such air inlet chambers are provided with central fuel injection and are therefore known.

BACKGROUND

In known motor vehicles with central fuel injection, the aspirated air passes radially from the air filter through a hose into the air inlet chamber. From there it flows axially into the mixture former. Because of this deflection in the air inlet chamber and also simply because the aspirated air is deflected several times before reaching the air inlet chamber, a flow profile results that is not homogeneous in terms of velocity and direction. This leads to distortions of the injection cone of the central fuel injection system. The result is that above a certain flow velocity or engine speed, a drop in output occurs because of poor mixture distribution. Even minor twisting of the hose leading from the air filter to the air inlet chamber causes considerable changes in the maximum possible power output of the internal combustion engine.

To make the flow profile uniform, it is a generally known process to place air conducting surfaces in a flow channel. U.S. Pat. No. 3,814,391, for example, discloses a mixture former which has numerous air conducting surfaces in the intake pipe behind a throttle valve to ensure uniform flow. Placement of deflection surfaces inside a mixture aspiration tube is also known, as disclosed by, for example German Auslegeschrift 1,962,113.

SUMMARY OF THE INVENTION

The invention entails configuring an air inlet chamber for a mixture former in such a way that improved mixture formation occurs in the mixture former at different engine speeds.

According to the invention, a star-shaped insert, acting as a flow rectifier, is placed in the air inlet chamber on the air outlet, dividing the air-flow into individual sectors.

This simple measure results in a considerable evening out of the performance characteristics of the internal combustion engine at different speeds. Furthermore, the course of the hose leading from the air filter to the air inlet chamber has much less influence on the performance characteristics of the internal combustion engine than in the case of an air inlet chamber without the insert according to the invention. As a result of the insert, the air is more evenly distributed before flowing into the mixture former, and flow eddying is reduced. This evening out of the flow is unusual for a fuel injection system, since intensive air eddying is more likely when attempting to generate a uniform fuel/air mixture in such a system.

The flow losses are reduced if the insert has a central hub which is rounded at the intake side resulting in the hub having a rounded tip at this side. The hub continuously increases in diameter from the rounded tip towards the air outlet.

Particularly significant evening out of the air-flow can be achieved with little outlay if the insert has a total of eight linearly oriented air conducting surfaces arranged in the form of rays.

The flow losses are further reduced if, according to an embodiment of the invention, each of the air conducting surfaces is configured as a symmetrical airfoil profile with a rounded leading edge and a pointed trailing edge.

The volumes of air flowing into the individual sectors formed by the insert are largely equal and free of torsion if guide vanes are placed on the side facing away from the air inlet between the air conducting surfaces.

To reduce flow resistance, each of these guide vanes also advantageously has a rounded leading edge and a pointed trailing edge.

The mixture former downstream from the air inlet chamber operates especially uniformly if the air outlet beneath the insert is nozzle-shaped.

Low flow losses and very uniform flow can be achieved if, according to an advantageous embodiment of the invention, the air outlet tapers from the lower edge of the insert to its end like a trumpet with a curved outer surface wherein the cross section of the air outlet adjacent its end is about one-third of its cross-section adjacent the lower edge of the insert.

The invention admits of numerous embodiments, one of which is depicted in the drawings to illustrate its basic principle and is described below.

BRIEF DRAWING DESCRIPTION

In the drawing.

Corresponding reference characters indicate corresponding parts throughout the several views of the drawing.

DETAILED DESCRIPTION

Figure 1:
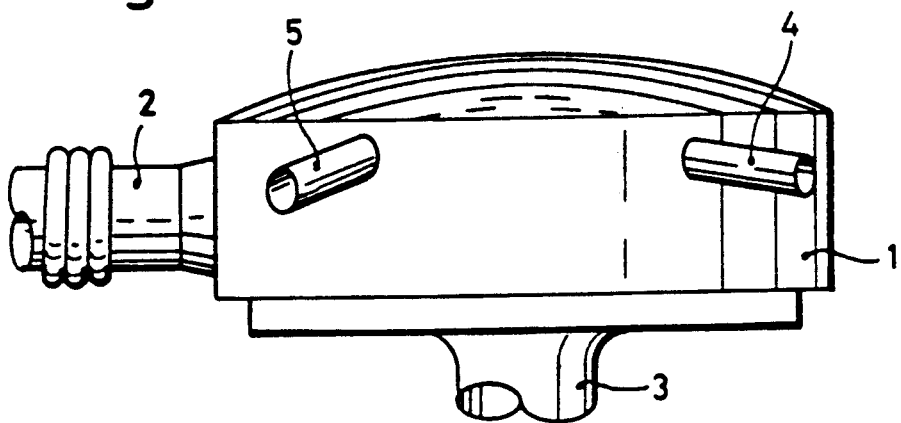
FIG. 1 shows a side view of the air inlet chamber according to the invention.

The air inlet chamber shown in FIG. 1 has a housing 1 with a lateral air inlet 2, to which a hose coming from the air filter is to be connected. The housing 1 has in its bottom surface a coaxial air outlet 3, through which the air is conveyed to a mixture former of a central fuel injection system. Also provided in the housing 1 are a connector 4 for the crankcase breather and a connector 5 for a pressure sensor.

Figure 2:
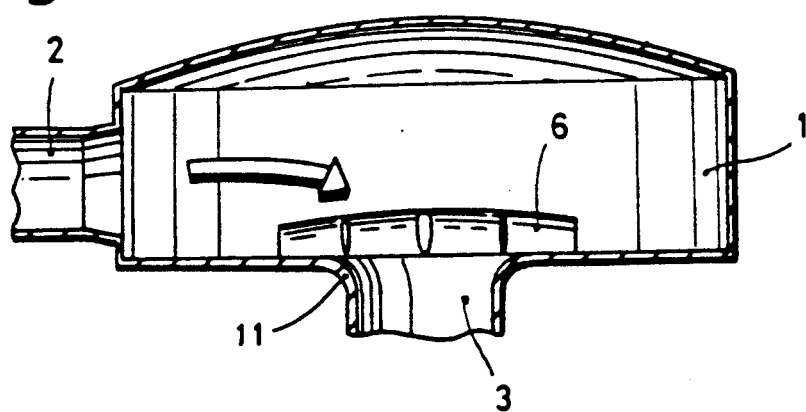
FIG. 2 shows a vertical section through the air inlet chamber according to FIG. 1.

An important element for the invention is a star-shaped insert 6, visible in FIG. 2, which sits in the housing 1 on the air outlet 3 and divides the air-flow into individual sectors. The insert 6 thereby serves to even out the air flowing in through the air inlet 2 and acts as a flow rectifier. FIG. 2 also shows that the air outlet 3 is nozzle-shaped and has a curved outer or enveloping surface 11. The air outlet 3 tapers from the lower edge of the insert 6 to its end like a trumpet wherein the cross section of the air outlet adjacent its end is about one-third of its cross-section adjacent to the lower edge of the insert 6.

Figure 3:
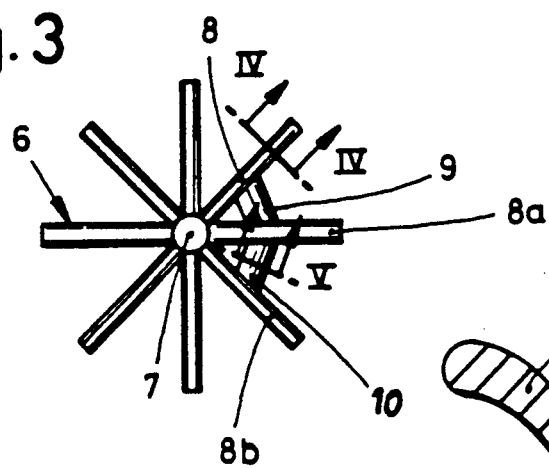
FIG. 3 shows a top view of an insert in the air inlet chamber.

FIG. 3 shows that the insert 6 consists of a central hub 7 and a total of eight rectilinearly extending air conducting surfaces 8 arranged in the form of rays. The central hub 7 becomes larger in diameter towards the air outlet and has a rounded tip. The central hub 7 is disposed in the air inlet chamber so that the air-flow impinges on the rounded tip and flows around the central hub. Furthermore, guide vanes 9, 10 are provided between the air conducting surfaces 8, 8a, 8b facing away from the air inlet 2.

Figure 4:
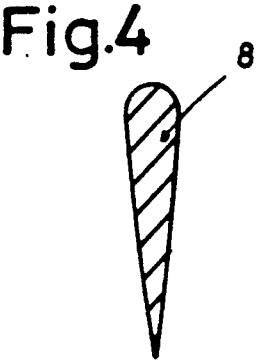
FIG. 4 shows a section through an air conducting surface of the insert, at enlarged scale.
Figure 5:
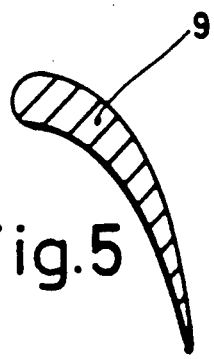
FIG. 5 shows a section through a guide vane of the insert, at enlarged scale.

FIG. 4 shows that each of the air conducting surfaces 8 has an airfoil profile which is symmetrical with respect to the axis of the air outlet 3. Each of the air conducting surfaces 8 has a pointed trailing edge adjacent the air outlet 3 and a rounded leading edge. The cross section of each of the guide vanes 9, 10 also comprises a pointed trailing edge adjacent the air outlet 3 and a rounded leading edge. FIG. 5 shows, using the example of the guide vane 9, that each of the guide vanes 9, 10 are curved such that the horizontally inflowing air is deflected downward to the air outlet 3.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

The embodiments of the invention in which an exclusive property or privilege is claimed are defined as follows:

1. An air inlet chamber for a mixture former of a fuel injection system of a motor vehicle, which comprises a lateral air inlet for connection to a hose coming from an air filter of the vehicle and an axial air outlet for introducing the air into the mixture former, in which in the air inlet chamber on the air outlet is disposed a star-shaped insert which divides the air-flow into individual sectors, as a flow rectifier.

2. An air inlet chamber according to claim 1, in which the insert has a central hub which becomes larger in diameter towards the air outlet and comprises a rounded tip, said central hub being disposed in the air inlet chamber so that the air-flow impinges on the rounded tip and flows around said central hub.

3. An air inlet chamber according to claim 1, in which the insert has a total of eight rectilinearly extending air conducting surfaces arranged in the form of rays.

4. An air inlet chamber according to claim 1, in which each of the air conducting surfaces has an airfoil profile which is symmetrical with respect to the axis of the air outlet, each of the air conducting surfaces having a rounded leading edge and a pointed trailing edge.

5. An air inlet chamber according to claim 1, in which the air outlet beneath the insert is nozzle-shaped.

6. An air inlet chamber for a mixture former of a motor vehicle, which comprises a lateral air inlet for connection to a hose coming from an air filter of the vehicle and an axial air outlet for introducing the air into the mixture former, in which in the air inlet chamber on the air outlet is disposed a star-shaped insert which divides the air-flow into individual sectors, as a flow rectifier and, in which on the side remote from the air inlet between the air conducting surfaces are disposed guide vanes.

7. An air inlet chamber according to claim 6, in which each of the guide vanes comprises a rounded leading edge and a pointed trailing edge.

8. An air inlet chamber for a mixture former of a motor vehicle, which comprises a lateral air inlet for connection to a hose coming from an air filter of the vehicle and an axial air outlet for introducing the air into the mixture former, in which in the air inlet chamber on the air outlet is disposed a star-shaped insert which divides the air-flow into individual sectors, as a flow rectifier, in which the air outlet beneath the insert is nozzle-shaped and, in which the air outlet tapers from the lower edge of the insert to its end like a trumpet with a curved outer surface wherein the cross section of the air outlet adjacent its end is about one-third of its cross-section adjacent the lower edge of the insert.

* * * * *